US009036993B2

(12) United States Patent
Melts et al.

(10) Patent No.: US 9,036,993 B2
(45) Date of Patent: May 19, 2015

(54) METHOD AND APPARATUS FOR DYNAMICALLY ALLOCATING BANDWIDTH TO A CLIENT IN A PASSIVE OPTICAL NETWORK

(71) Applicant: Marvell World Trade Ltd., St. Michael (BB)

(72) Inventors: Dimitry Melts, Cupertino, CA (US); Tsahi Daniel, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 94 days.

(21) Appl. No.: 13/765,565

(22) Filed: Feb. 12, 2013

(65) Prior Publication Data
US 2013/0209103 A1    Aug. 15, 2013

Related U.S. Application Data

(60) Provisional application No. 61/598,242, filed on Feb. 13, 2012.

(51) Int. Cl.
H04B 10/27 (2013.01)
H04J 14/02 (2006.01)
H04L 12/835 (2013.01)

(52) U.S. Cl.
CPC .............. *H04B 10/27* (2013.01); *H04L 47/30* (2013.01); *H04J 14/0249* (2013.01)

(58) Field of Classification Search
CPC .............. H04Q 11/0067; H04Q 2011/0064; H04Q 2011/0079; H04J 3/1694; H04J 14/0252; H04J 14/0247; H04L 12/14; H04L 12/1403; H04L 12/1457; H04L 12/28; H04M 15/00; H04M 15/53; H04M 2215/0172; H04M 2215/2013; H04M 15/43; H04M 15/64; H04M 15/65; H04B 10/0773
See application file for complete search history.

(56) References Cited

U.S. PATENT DOCUMENTS

| 6,542,511 | B1 | 4/2003 | Livermore et al. |
| 8,081,661 | B2 * | 12/2011 | Yoo et al. ................ 370/468 |
| 8,437,355 | B1 * | 5/2013 | Goodson ................ 370/395.4 |
| 2003/0048805 | A1 | 3/2003 | Yoshihara et al. |
| 2003/0219015 | A1 | 11/2003 | Constant Six et al. |
| 2004/0141759 | A1 * | 7/2004 | Stiscia et al. ................ 398/168 |
| 2005/0047783 | A1 * | 3/2005 | Sisto et al. ................ 398/71 |
| 2005/0053085 | A1 * | 3/2005 | Doh et al. ................ 370/431 |
| 2006/0013247 | A1 * | 1/2006 | Koch et al. ................ 370/437 |

(Continued)

FOREIGN PATENT DOCUMENTS

| EP | 2111055 | 10/2009 |
| WO | WO2009069880 | 6/2009 |

OTHER PUBLICATIONS

The PCT Search Report mailed Apr. 26, 2013 for PCT application No. PCT/US13/25944, 11 pages.

*Primary Examiner* — Ken Vanderpuye
*Assistant Examiner* — Jose Luis F Pugeda

(57) ABSTRACT

Embodiments of the present disclosure provide methods for allocating bandwidth to a plurality of traffic containers of a passive optical network. The method comprises receiving upstream data from a plurality of traffic containers of the passive optical network and passing the upstream data to a traffic manager. The method further comprises dynamically changing the allocated bandwidth based at least in part on the amount of the upstream data stored in one or more queues of the traffic manager.

21 Claims, 4 Drawing Sheets

(56) References Cited

U.S. PATENT DOCUMENTS

| | | | |
|---|---|---|---|
| 2006/0018322 A1* | 1/2006 | Oron | 370/395.1 |
| 2006/0093356 A1 | 5/2006 | Vereen et al. | |
| 2006/0233197 A1* | 10/2006 | Elmoalem et al. | 370/468 |
| 2007/0064732 A1 | 3/2007 | Liaw et al. | |
| 2007/0121507 A1 | 5/2007 | Manzalini et al. | |
| 2007/0133988 A1* | 6/2007 | Kim et al. | 398/69 |
| 2007/0133989 A1 | 6/2007 | Kim et al. | |
| 2007/0248109 A1* | 10/2007 | DeCarolis et al. | 370/412 |
| 2009/0103545 A1* | 4/2009 | Anschutz et al. | 370/395.4 |
| 2009/0238567 A1 | 9/2009 | Miller et al. | |
| 2009/0245784 A1* | 10/2009 | Wang | 398/25 |
| 2010/0221006 A1* | 9/2010 | Yoon et al. | 398/58 |
| 2011/0129223 A1* | 6/2011 | Yoo et al. | 398/58 |
| 2013/0124753 A1* | 5/2013 | Ansari et al. | 709/235 |

\* cited by examiner

METHOD AND APPARATUS FOR DYNAMICALLY ALLOCATING BANDWIDTH TO A CLIENT IN A PASSIVE OPTICAL NETWORK

CROSS-REFERENCE TO RELATED APPLICATION

This claims priority to U.S. Provisional Patent Application No. 61/598,242, filed on Feb. 13, 2012, which is incorporated herein by reference.

TECHNICAL FIELD

The disclosure relates to methods and systems for dynamically allocating bandwidth to multiple traffic containers of a passive optical network.

BACKGROUND

In a passive optical network (PON) a service provider implements what is known as an optical line termination (OLT), which is the root of a fiber distribution network. A single optical fiber extends from the OLT, and multiple passive optical splitters are used to split the fiber into multiple branches. The endpoints or clients of the distribution network are formed by optical network units (ONUs), which correspond to customers or end users.

Data from the service provider to clients is broadcast over the fiber distribution network, and each individual client filters the broadcast data to select the data intended for the client. Clients send upstream data to the service provider using a form of time-division multiplexing, in which each client is assigned a fraction of the available time in which to send data. Dynamic bandwidth allocation (DBA) is typically used for upstream data, so that upstream bandwidth is allocated based on the changing needs of the clients, the priorities of different types of data, and the service level agreements (SLAs) between the service provider and the customers.

A good DBA algorithm is essential for optimal network performance and utilization. Many types of data traffic are bursty and highly variable. By carefully managing upstream bandwidth allocation, a provider can oversubscribe a network while still providing guaranteed levels of service to individual customers.

In certain environments, such as gigabit-capable PON (GPON), there are two forms of DBA: non-status reporting (NSR) and status reporting (SR). Each ONU may have several transmission virtual pipes (referred to as transmission containers or TCONTs), each with its own priority or traffic class. In non-status reporting DBA, an OLT observes upstream traffic and when a given transmission container is not sending idle frames during its scheduled fixed allocations, the OLT may decide to increase the bandwidth allocation to that TCONT (depending on customer SLAs, TCONT types and other information), thereby allowing the TCONT to utilize a larger bandwidth for a burst of traffic. Once the burst has been transferred, the OLT will observe a large number of idle frames from the TCONT, and will reduce the allocation to the TCONT to fixed level. Non-status reporting DBA has the advantage that it imposes no requirements on the ONU. The disadvantage of non-status reporting DBA is that the OLT does not know how much excess data is waiting to be transmitted at each TCONT. Rather, the OLT allocates additional upstream bandwidth until a TCONT starts sending idle frames. Without knowing in advance the complete picture (how much data each TCONT has to transmit) it is impossible to reach optimized performance (consistent and low latency) and network utilization.

In status reporting DBA, the OLT repeatedly polls all or some of the TCONTS of some or all attached ONUs for their data backlogs. Each TCONT or virtual pipe has one or more physical queues with integrated scheduling mechanisms implemented by the ONU. An ONU reports on each TCONT separately to the OLT. Each report message contains a logarithmic measure of the data in all respective physical queues associated with given TCONT. Upon receiving reports from every relevant TCONT of the system, the OLT can calculate an optimized bandwidth map based on applicable SLAs as well as the current backlog of each transmission pipe.

Ethernet PON (EPON) uses a status reporting DBA mechanism similar to the GPON status reporting mechanism described above.

SUMMARY

In an embodiment, a method is provided for allocating bandwidth to a plurality of traffic containers of a passive optical network. The method comprises receiving upstream data from a plurality of traffic containers of the passive optical network and passing the upstream data to a traffic manager. The traffic manager comprises a queue having a predetermined capacity to store an amount of the upstream data prior to the upstream data being sent to a network component further upstream in the passive optical network relative to the traffic manager. Each traffic container respectively sends upstream data to the traffic manager in accordance with a bandwidth respectively allocated to the traffic container. The method further comprises dynamically changing the bandwidth respectively allocated to each of the traffic containers based at least in part on the amount of the upstream data stored in the queue of the traffic manager in relation to the predetermined capacity of the queue of the traffic manager.

The techniques described herein may be used to increase overall system performance by optimizing upstream bandwidth utilization.

BRIEF DESCRIPTION OF THE DRAWINGS

Embodiments of the present disclosure will be readily understood by the following detailed description in conjunction with the accompanying drawings. To facilitate this description, like reference numerals designate like structural elements.

DETAILED DESCRIPTION

Figure 1:
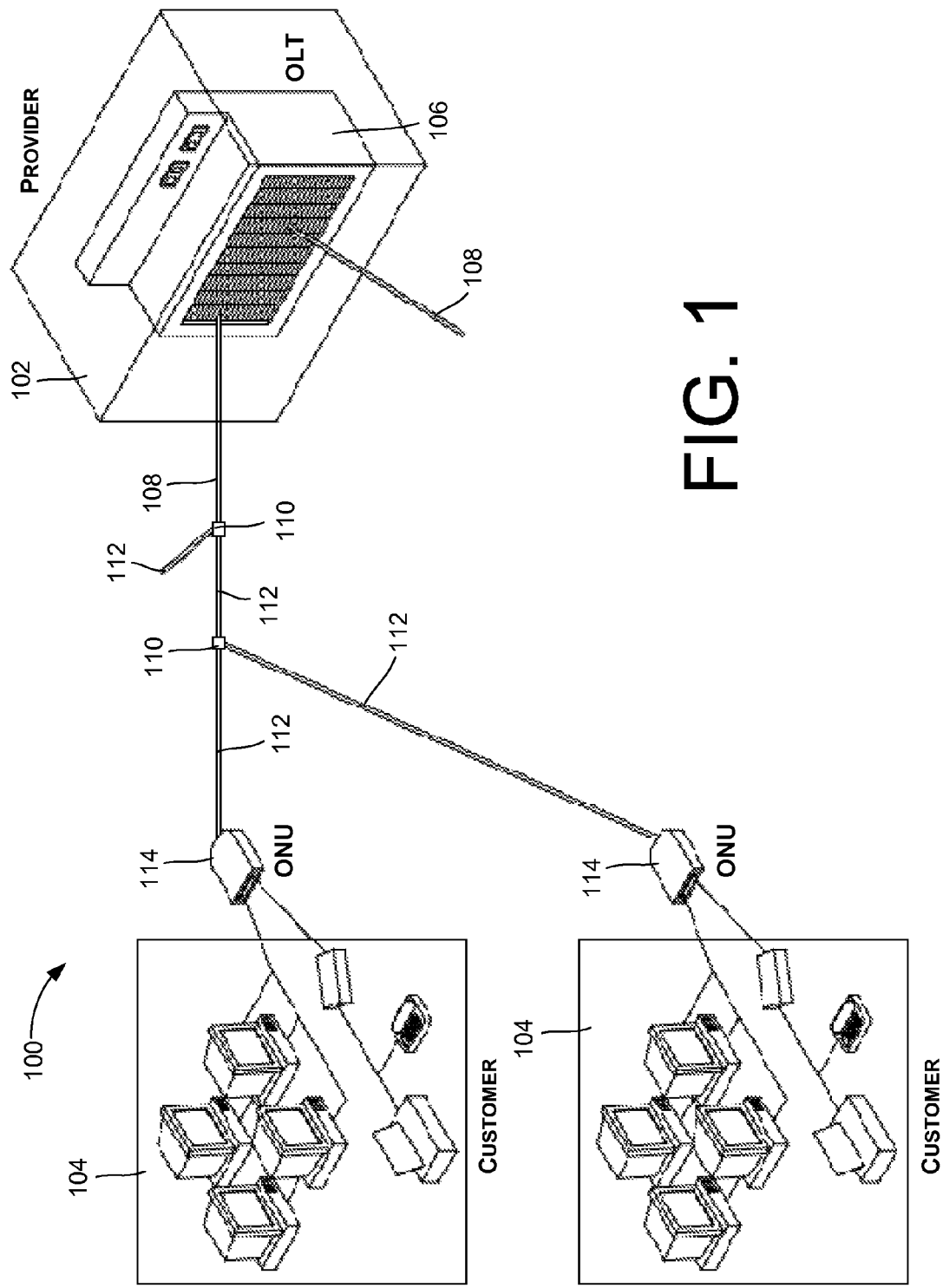
FIG. 1 is a schematic diagram of a passive optical network environment in which the techniques described herein may be employed.

FIG. 1 illustrates an example network system 100 that uses a passive optical network (PON). The system 100 includes a service provider or central office (CO) 102, which acts as a base for data transmission and reception between the service provider 102 and multiple customers or user premises 104.

The service provider 102 has an optical line terminal (OLT) 106, from which multiple optical fibers 108 extend. Passive optical splitters 110 are used to split an individual fiber into multiple branch fibers 112. The branch fibers 112 extend to optical network units (ONUs) 114, which terminate the branch fibers and provide Ethernet or other types of data connections to the user premises 104. Multiple levels of splitters may be used to create tree-type distribution structures that are rooted at the OLT 106.

Figure 2:
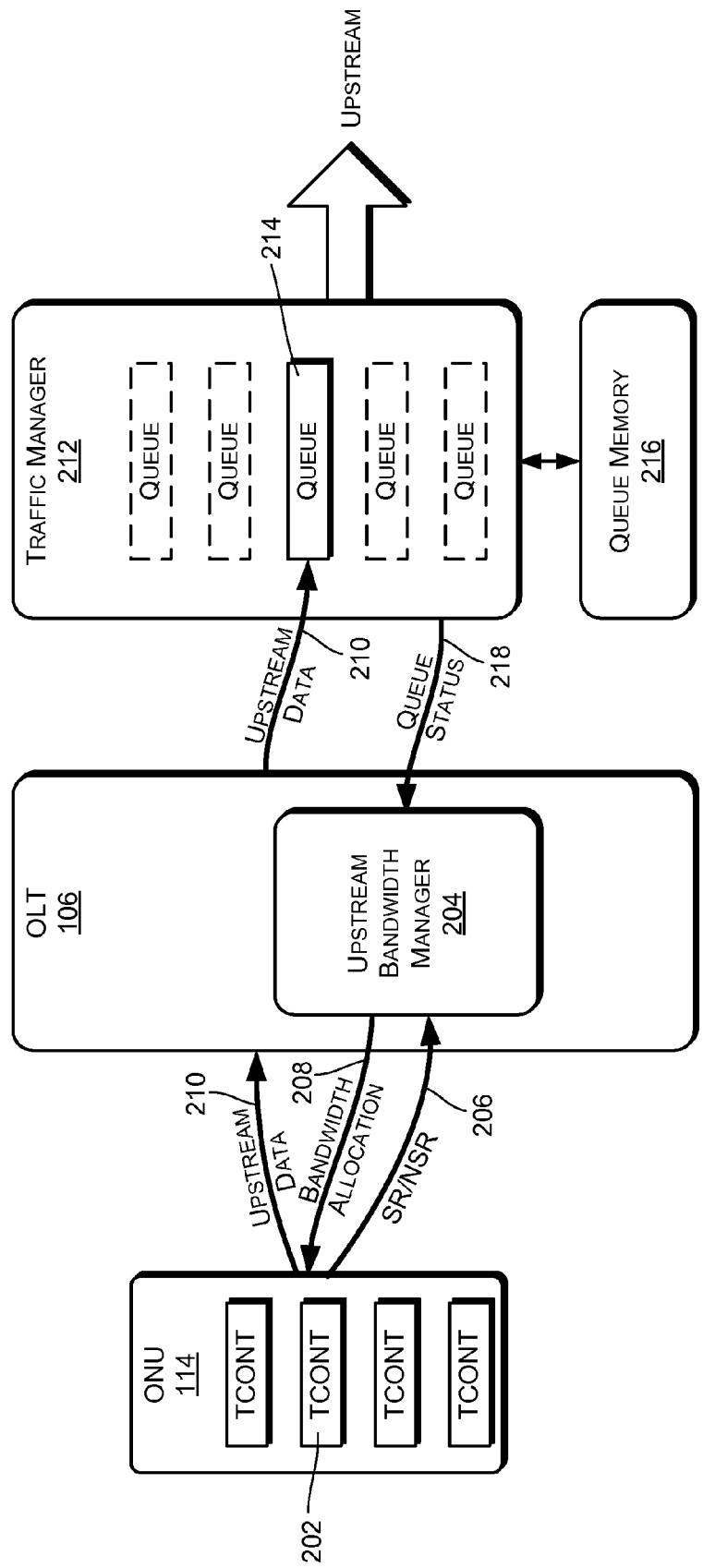
FIG. 2 is a block diagram illustrating upstream bandwidth management as may be performed in the environment depicted by FIG. 1.

FIG. 2 illustrates high-level details regarding upstream communication and dynamic upstream bandwidth management performed by the OLT 106 with respect to multiple ONUs 114.

Each ONU 114 typically has one or more transmission containers (TCONTs) 202, each of which may have one or more queues holding data that is to be transmitted to the OLT 106. The various TCONTs of an individual ONU may correspond to different types of traffic, which may have different priorities or upstream data needs.

The OLT 106 has an upstream bandwidth manager 204 that dynamically allocates bandwidth to the TCONTs. The bandwidth manager 204 receives information, referred to herein as demand information, regarding the current bandwidth needs of the TCONTs 202. The demand information may be conveyed by status reporting (SR) and/or non-status reporting (NSR) information 206, also referred to herein as SR/NSR information 206. In the status reporting situations, the demand information may comprise explicit indications or reports from the ONU 114 and/or the TCONTs 202 regarding the current demand of the ONU 114 and its individual TCONTs 202, such as the amount of data that is currently queued by each of the TCONTs 202. In non-status reporting situations, the demand information may be indicated by the number or rate of idle frames sent by the ONU 114—an absence or deficiency of idle frames indicates an increasing need for upstream bandwidth, and an excess of idle frames indicates a decreasing need for upstream bandwidth.

The upstream bandwidth manager 204 of the OLT 106 evaluates the SR/NSR information 206 and sends a bandwidth allocation message 208 to the ONU, indicating allocated upstream bandwidth and multiplex scheduling information for each of the TCONTS 202. The ONU 114 sends upstream data 210 based on the bandwidth allocated by the upstream bandwidth manager 204. As will be described in more detail below, the bandwidth allocation 208 is also based on the status of queues that are used to buffer received upstream data before the data is aggregated and passed to upstream network components.

The OLT 106 includes or works in conjunction with a traffic manager (TM) 212. The OLT 106 passes received upstream data to the traffic manager 212, which aggregates the data from multiple TCONTs and sends the aggregated data to upstream network components such as network switches, routers, and so forth.

The traffic manager 212 has multiple target queues 214 that are used to queue the received upstream data 210 before the upstream data is aggregated and sent to the upstream network components. The target queues 214 may correspond to different ONUs 114, to different TCONTs 202 of different ONUs 114, to different classes of service, and/or to different data priorities. The traffic manager 212 has queue memory 216 that is used by the traffic manager 212 to store the target queues 214.

The OLT 106 and the traffic manager 212 may be implemented in various different configurations. In some embodiments, the OLT 106 and the traffic manager 212 may be implemented together, as part of a single component or subsystem. In other embodiments, the OLT 106 and the traffic manager 212 may be implemented as discrete elements of a component, as different components, or as different sub-components or elements of a system.

The target queues 214 of the traffic manager 212 may at times become full and overflow, which may result in upstream data being discarded or lost. This may be due to constraints of the queue memory 216 and/or to congestion of network elements upstream of the traffic manager 212. The traffic manager 212 is configured to evaluate the status of its target queues 214, based on current utilization, and to report queue utilization status 218 to the OLT 106.

The OLT 106 is configured to receive the target queue status 218 from the traffic manager 212. The queue status 218 indicates information about the available capacity of the target queues 214 and/or the queue memory 216. For example, the target queue status 218 may indicate that certain target queues 214 are full or nearing full capacity, or that the queue memory 216 is full or nearing full capacity. In some embodiments, the queue status 218 may indicate remaining available capacity of one or more of the target queues 214 and/or the queue memory 216. Reported utilization and capacities may be specified to the OLT 106 in absolute or relative terms.

The upstream bandwidth manager 204 is configured to account for current target queue utilization when allocating upstream bandwidth to ONUs 114 and/or TCONTS 202. When a target queue is nearing its capacity, the upstream bandwidth manager 204 decreases the bandwidth allocation of the corresponding TCONT 202 relative to the bandwidth that may have otherwise been allocated when based strictly on status reporting and/or non-status reporting allocations.

Accounting for target queue utilization and capacity may prevent situations in which the target queues 214 are overrun by transmissions from the ONU 114, and thereby avoid or prevent wasted bandwidth allocations.

Figure 3:
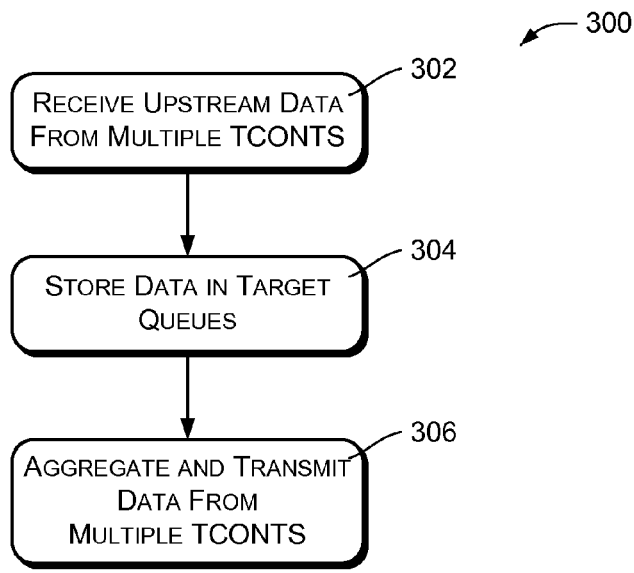
FIG. 3 is a flowchart showing an example process of conveying upstream data from multiple traffic containers to upstream network components such as may be performed in the environment depicted by FIG. 1.

FIG. 3 illustrates an example method 300 of conveying upstream data from multiple TCONTs to upstream network components. The illustrated actions may be performed by the OLT 106 and/or the traffic manager 212. An action 302 comprises receiving upstream data from multiple TCONTs. The upstream data is transmitted by the ONUs 114 in accordance with allocated bandwidth and scheduling information provided by the OLT 106 as described above.

An action 304 comprises storing the received data in one or more target queues 214 of the traffic manager 212. An action 306, performed by the traffic manager 212, comprises aggregating the data received from multiple TCONTs and transmitting the data to upstream network components.

Figure 4:
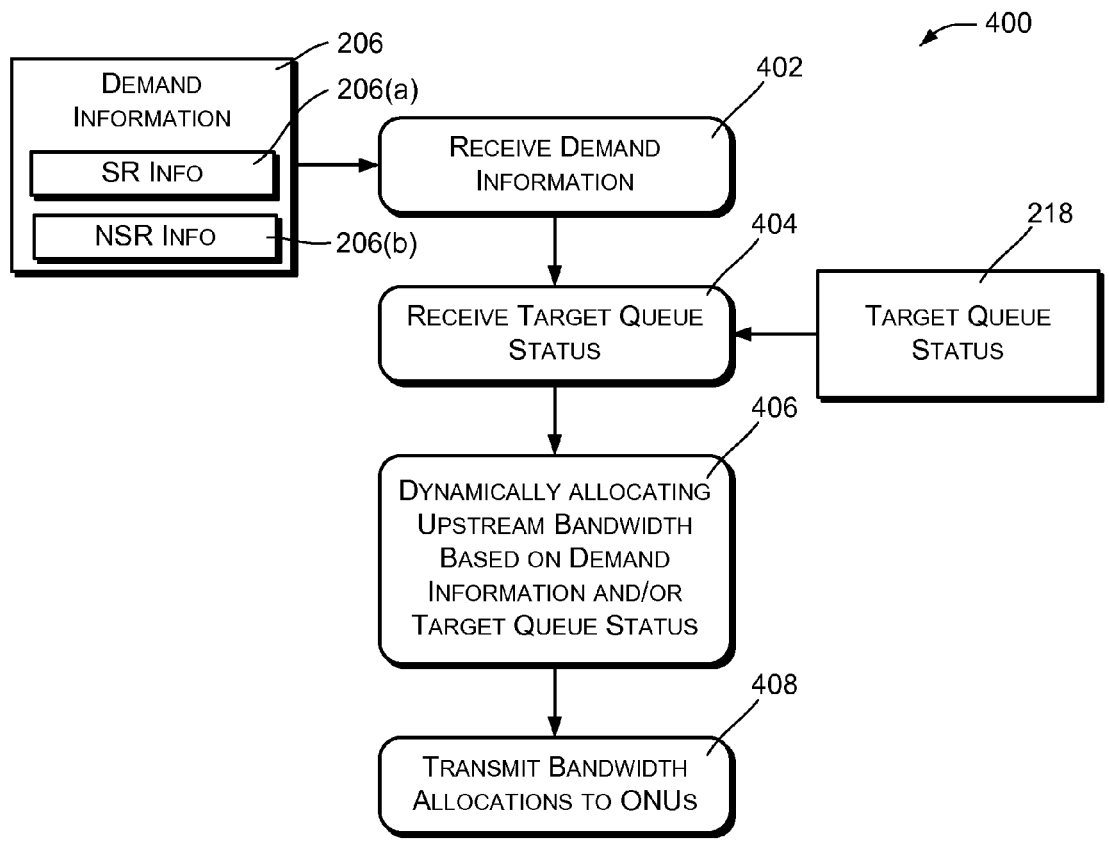
FIG. 4 is a flowchart showing an example process of dynamic upstream bandwidth allocation in the environment depicted by FIG. 1.

FIG. 4 illustrates an example method 400 of performing dynamic bandwidth allocation in a passive optical network, utilizing the techniques described above. The method 400 may be performed by the OLT 106 and/or the traffic manager 212. As mentioned above, the OLT 106 and the traffic manager 212 may in some situations be implemented by a single entity or component. In other situations, the OLT 106 and the traffic manager 212 may be separate entities, components, or sub-elements of a system.

An action 402 comprises receiving the upstream demand information 206 from the ONU 114. The upstream demand information 206 may comprise SR information 206($a$) and/or non-status reporting information 206($b$). The status reporting information 206($a$) comprises explicit reports produced by the ONUs 114 regarding TCONT utilization or backlog. The non-status reporting information 206(b) comprises the number or rate of idle frames transmitted by the ONUs and/or TCONTs 202. The reception of idle frames by the OLT 106 indicates that not all of the bandwidth currently allocated to the ONU 114 or TCONT 202 is being utilized, and that the upstream bandwidth allocation to that ONU or TCONT may therefore be decreased. Reception of relatively few or no idle frames from an ONU 114 or TCONT 202 indicates that all or nearly all of the bandwidth currently allocated to the ONU or TCONT is being utilized, and that the upstream bandwidth allocation to that ONU may be increased.

An action 404 comprises obtaining or receiving the target queue status 218. The target queue status is obtained from the traffic manager 212 in the embodiment shown by FIG. 2. In situations where the OLT 106 and the traffic manager 212 are implemented as a single component or subsystem, the target queue status 218 may be immediately available to the upstream bandwidth manager 204 of the OLT 106. In other situations, where the traffic manager 212 resides on a component or subsystem that is separate from the OLT 106, a communication channel or mechanism may be established between the OLT 106 and the traffic manager 212 for transfer of the target queue status 218. Existing in-band or out-of-band protocols may be used for this purpose, or different protocols may be defined. Quantized Congestion Notification (QCN) is an example of a protocol that may be used to convey target queue status 218 from the traffic manager 212 to the OLT 106 in situations where the traffic manager 212 and the OLT 106 reside on separate components or subsystems.

An action 406 comprises dynamically allocating bandwidth based on one or more factors, which may include (a) the status reporting information 206(a); the non-status reporting information 206(b); and/or the target queue status 218.

In some embodiments, the upstream bandwidth manager 204 may perform preliminary upstream bandwidth allocations based on status reporting and/or non-status reporting techniques, and may then modify the preliminary allocations based on the current target queue status. For example, a preliminary upstream bandwidth allocation for a particular TCONT 202 may be decreased when conditions are detected in which the preliminary allocation for the TCONT 202 is likely to result in overflow of the target queue 214 corresponding to the TCONT 202.

In other embodiments, bandwidth allocations may be calculated in a single pass that simultaneously accounts for both demand information 206 and target queue status 218.

Generally, the action 406 of allocating upstream bandwidth is performed so as to prevent, avoid, or minimize the likelihood of overruns of the target queues 214, while also accounting for current upstream bandwidth needs of the TCONTs 202. This may include decreasing bandwidth allocation to a particular TCONT 202, based at least in part on the queue status, to avoid overrunning one or more target queues of the traffic manager 212.

An action 408 comprises transmitting the bandwidth allocations 208 to the ONUs 114.

The actions of FIG. 4 are performed repetitively, to continuously or periodically provide updated bandwidth allocations to the ONUs 114.

Figure 5:
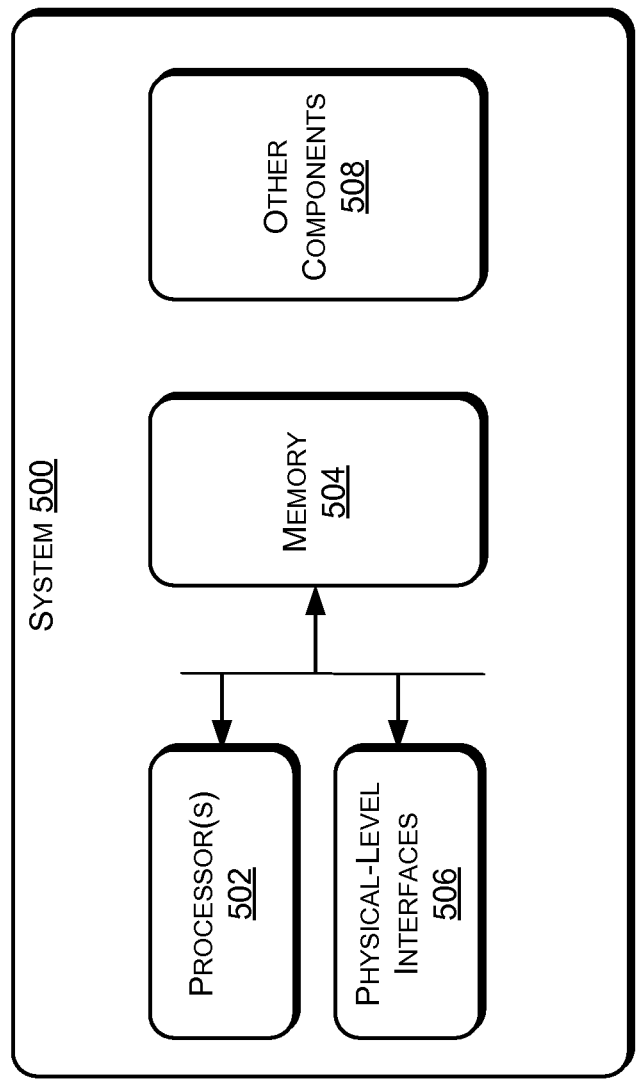
FIG. 5 is an example computing system usable to implement the various techniques described herein.

FIG. 5 illustrates an example system 500 that may be used to implement the techniques described above. The system may in some cases comprise an optical line terminal, such as use in a passive optical network.

Generally, the system 500 may be configured as any suitable device, including hardware-based devices, software-based devices, and devices using combinations or hardware-based and software-based logic. FIG. 5 shows an example of a software-based implementation, although other implementations may be based on non-programmable hardware or hard-wired logic, including field-programmable gate arrays (FPGAs), (ASICs), and so forth. In addition, the system 500 may be implemented as part of a switch or network processor device.

In an example configuration, the computing system 500 comprises one or more processors 502 and memory 504. The memory 504 may store program instructions that are loadable and executable on the processor(s) 502, as well as data generated during execution of, and/or usable in conjunction with, these programs. The memory 504 may include volatile memory (such as random access memory (RAM)) and/or non-volatile memory (such as read-only memory (ROM), flash memory, etc.). The memory 504 may also include additional removable storage and/or non-removable storage including, but not limited to, flash memory, magnetic storage, optical storage, and/or tape storage that may provide non-volatile storage of computer readable instructions, data structures, program modules, and other data.

The memory 504 is an example of computer-readable media. Computer-readable media includes at least two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The memory 504 may include programs, instructions, modules, etc., for performing any or all of the functions described above and attributed to the provider 102 and/or elements of the provider 102 such as the OLT 106 and/or the traffic manager 212.

The system 500 also comprises physical-level interfaces 506, such as fiber optic interfaces and other data communications interfaces as may be needed in various environments. The system 500 may further include various other components 508, which may be used to implement all or part of the functionality described above. Other components 508 may include non-programmable and/or hardwired logic, hardware and software based devices, and various other elements.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Further aspects of the present disclosure relates to one or more of the following clauses. In one embodiment, a system is provided for allocating bandwidth to a plurality of traffic containers of a passive optical network. The system comprises an optical line terminal configured to receive upstream data from the plurality of traffic containers of the passive optical network and to pass the upstream data to a traffic manager. The traffic manager comprises a queue having a predetermined capacity to store an amount of the upstream data prior to the upstream data being sent to a network component further upstream in the passive optical network relative to the traffic manager. Each traffic container respectively sends upstream data to the traffic manager in accordance with a bandwidth respectively allocated to the traffic container. The system further comprises an upstream bandwidth manager configured to dynamically change the bandwidth respectively allocated to each of the traffic containers based at least in part on the amount of the upstream data stored in the queue of the traffic manager in relation to the predetermined capacity of the queue of the traffic manager.

The upstream bandwidth manager may be configured to dynamically change the bandwidth respectively allocated to each of the traffic containers, based on upstream demand information received from the traffic containers.

The upstream bandwidth manger may also be configured to dynamically change the bandwidth based at least in part on status reports received from the traffic containers regarding data backlogs of the traffic containers.

The upstream bandwidth manger may also be configured to dynamically change the bandwidth based at least in part on receiving idle frames from the traffic containers.

The system may comprise the traffic manager, which may be configured to receive the upstream data from the optical line terminal, to store the upstream data in the queue, to aggregate the upstream data stored in the queue, and to transmit the aggregated upstream data to the network component further upstream in the passive optical network relative to the traffic manager.

The system may further comprise a plurality of optical network units containing the plurality of traffic containers, wherein the optical network units are configured to communicate the upstream data to the optical line terminal through the passive optical network.

The optical line terminal may be further configured to decrease bandwidth allocation to a particular traffic container to avoid overrunning the queue of the traffic manager.

In a further embodiment, a method is provided for allocating bandwidth to a plurality of traffic containers of a passive optical network. The method comprises receiving upstream data from a plurality of traffic containers of the passive optical network, and passing the upstream data to a traffic manager. The traffic manager comprises a queue having a predetermined capacity to store an amount of the upstream data prior to the upstream data being sent to a network component further upstream in the passive optical network relative to the traffic manager. Each traffic container respectively sends upstream data to the traffic manager in accordance with a bandwidth respectively allocated to the traffic container. The method further comprises dynamically changing the bandwidth respectively allocated to each of the traffic containers based at least in part on the amount of the upstream data stored in the queue of the traffic manager in relation to the predetermined capacity of the queue of the traffic manager.

Dynamically changing the bandwidth may be further based at least in part on upstream demand information received from the traffic containers, on status reports received from the traffic containers regarding data backlogs of the traffic containers, and/or on receiving idle data frames from the traffic containers.

The method may further comprise storing the upstream data in the queue, aggregating the upstream data stored in the queue, and transmitting the aggregated upstream data to the network component further upstream in the passive optical network relative to the traffic manager.

The method may also comprise decreasing bandwidth allocation to a particular traffic container to avoid overrunning the queue of the traffic manager.

The traffic containers may be maintained by one or more optical network unites of the passive optical network units of the passive optical network.

In another embodiment, one or more computer-readable storage media store a plurality of instructions that are executable by one or more processors of a computing system to cause the computing system to perform actions. The actions comprise receiving upstream data from a plurality of traffic containers of a passive optical network and passing the upstream data to a traffic manager of the passive optical network. The traffic manager comprises a queue having a predetermined capacity to store an amount of the upstream data prior to the upstream data being sent to a network component further upstream in the passive optical network relative to the traffic manager. Each traffic container respectively sends upstream data to the traffic manager in accordance with a bandwidth respectively allocated to the traffic container. The actions further comprise dynamically changing the bandwidth respectively allocated to each of the traffic containers based at least in part on the amount of the upstream data stored in the queue of the traffic manager in relation to the predetermined capacity of the queue of the traffic manager.

Dynamically changing the bandwidth may be further based at least in part on upstream demand information received from the traffic containers, on status reports received from the traffic containers regarding data backlogs of the traffic containers, and/or on receiving idle data frames from the traffic containers.

The actions may further comprise storing the upstream data in the queue, aggregating the upstream data stored in the queue, and transmitting the aggregated upstream data to the network component further upstream in the passive optical network relative to the traffic manager.

The actions may further comprise decreasing bandwidth allocation to a particular traffic container to avoid overrunning the queue of the traffic manager.

Although the above description assigns functional responsibilities to discrete logical elements or components for purposes of discussion, the described functionality may be implemented in various different ways, using various different programmatic and/or logical architectures and configurations, including the use of different functional elements.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A system for allocating bandwidth to a plurality of traffic containers of a passive optical network, the system comprising:
    an optical line terminal configured to (i) receive upstream data from the plurality of traffic containers of the passive optical network and (ii) to pass the upstream data to a traffic manager, wherein the traffic manager is different and separate from the optical line terminal, wherein the traffic manager comprises a queue having a predetermined capacity to store an amount of the upstream data prior to the upstream data being sent to a network component further upstream in the passive optical network relative to the traffic manager, wherein each traffic container respectively sends upstream data to the traffic manager in accordance with a bandwidth respectively allocated to the traffic container, wherein the optical line terminal is further configured to receive, from the traffic manager, a queue status that provides an indication of the amount of the upstream data stored in the queue of the traffic manager in relation to the predetermined capacity of the queue of the traffic manager; and
    an upstream bandwidth manager configured to, based at least in part on the indication of the amount of the upstream data stored in the queue of the traffic manager in relation to the predetermined capacity of the queue of the traffic manager, dynamically change the bandwidth respectively allocated to each of the traffic containers.

2. The system of claim 1, wherein the upstream bandwidth manager is further configured to dynamically change the bandwidth respectively allocated to each of the traffic containers based on upstream demand information received from the traffic containers.

3. The system of claim 1, further comprising the traffic manager, wherein the traffic manager is configured to:
    receive the upstream data from the optical line terminal;
    store the upstream data in the queue;
    aggregate the upstream data stored in the queue; and
    transmit the aggregated upstream data to the network component further upstream in the passive optical network relative to the traffic manager.

4. The system of claim 1, further comprising a plurality of optical network units containing the plurality of traffic containers, wherein the optical network units are configured to communicate the upstream data to the optical line terminal through the passive optical network.

5. The system of claim 1, wherein the upstream bandwidth manager is further configured to dynamically change the bandwidth based at least in part on status reports received from the traffic containers regarding data backlogs of the traffic containers.

6. The system of claim 1, wherein the upstream bandwidth manager is further configured to dynamically change the bandwidth based at least in part on receiving idle data frames from the traffic containers.

7. The system of claim 1, wherein the optical line terminal is further configured to decrease bandwidth allocation to a particular traffic container to avoid overrunning the queue of the traffic manager.

8. A method of allocating bandwidth to a plurality of traffic containers of a passive optical network, the method comprising:
    receiving, by an optical line terminal, upstream data from a plurality of traffic containers of the passive optical network;
    passing, by the optical line terminal, the upstream data to a traffic manager that is different and separate from the optical line terminal, wherein the traffic manager comprises a queue having a predetermined capacity to store an amount of the upstream data prior to the upstream data being sent to a network component further upstream in the passive optical network relative to the traffic manager, and wherein each traffic container respectively sends upstream data to the traffic manager in accordance with a bandwidth respectively allocated to the traffic container;
    receiving, by the optical line terminal and from the traffic manager, a queue status that provides an indication of the amount of the upstream data stored in the queue of the traffic manager in relation to the predetermined capacity of the queue of the traffic manager; and
    based at least in part on the indication of the amount of the upstream data stored in the queue of the traffic manager in relation to the predetermined capacity of the queue of the traffic manager, dynamically changing the bandwidth respectively allocated to each of the traffic containers.

9. The method of claim 8, wherein dynamically changing the bandwidth is further based at least in part on upstream demand information received from the traffic containers.

10. The method of claim 8, further comprising:
    storing the upstream data in the queue;
    aggregating the upstream data stored in the queue; and
    transmitting the aggregated upstream data to the network component further upstream in the passive optical network relative to the traffic manager.

11. The method of claim 8, wherein dynamically changing the bandwidth is further based at least in part on status reports received from the traffic containers regarding data backlogs of the traffic containers.

12. The method of claim 8, wherein dynamically changing the bandwidth is further based at least in part on receiving idle data frames from the traffic containers.

13. The method of claim 8, further comprising decreasing bandwidth allocation to a particular traffic container to avoid overrunning the queue of the traffic manager.

14. The method of claim 8, wherein the traffic containers are maintained by one or more optical network units of the passive optical network.

15. One or more non-transitory computer-readable storage media storing a plurality of instructions executable by one or more processors of a computing system to cause the computing system to perform actions comprising:
    receiving, by an optical line terminal, upstream data from a plurality of traffic containers of a passive optical network;
    passing, by the optical line terminal, the upstream data to a traffic manager of the passive optical network, wherein the traffic manager of the passive optical network is different and separate from the optical line terminal, wherein the traffic manager comprises a queue having a predetermined capacity to store an amount of the upstream data prior to the upstream data being sent to a network component further upstream in the passive optical network relative to the traffic manager, and wherein each traffic container respectively sends upstream data to the traffic manager in accordance with a bandwidth respectively allocated to the traffic container;

receiving, by the optical line terminal and from the traffic manager, a queue status that provides an indication of the amount of the upstream data stored in the queue of the traffic manager in relation to the predetermined capacity of the queue of the traffic manager; and based at least in part on the indication of the amount of the upstream data stored in the queue of the traffic manager in relation to the predetermined capacity of the queue of the traffic manager, dynamically changing the bandwidth respectively allocated to each of the traffic containers.

16. The one or more non-transitory computer-readable storage media of claim 15, wherein dynamically changing the bandwidth is further based at least in part on upstream demand information received from the traffic containers.

17. The one or more non-transitory computer-readable storage media of claim 15, the actions further comprising:
storing the upstream data in the queue;
aggregating the upstream data stored in the queue; and
transmitting the aggregated upstream data to the network component further upstream in the passive optical network relative to the traffic manager.

18. The one or more non-transitory computer-readable storage media of claim 15, wherein dynamically changing the bandwidth is further based at least in part on status reports received from the traffic containers regarding data backlogs of the traffic containers.

19. The one or more non-transitory computer-readable storage media of claim 15, wherein dynamically changing the bandwidth is further based at least in part on receiving idle data frames from the traffic containers.

20. The one or more non-transitory computer-readable storage media of claim 15, the actions further comprising decreasing bandwidth allocation to a particular traffic container to avoid overrunning the queue of the traffic manager.

21. The system of claim 1, wherein queue status is received by the optical line terminal from the traffic manager using a quantized congestion notification (QCN) protocol.

* * * * *